O. K. PORTER.
FRUIT GRADER.
APPLICATION FILED MAR. 20, 1913.
1,182,505.
Patented May 9, 1916.
5 SHEETS—SHEET 1.
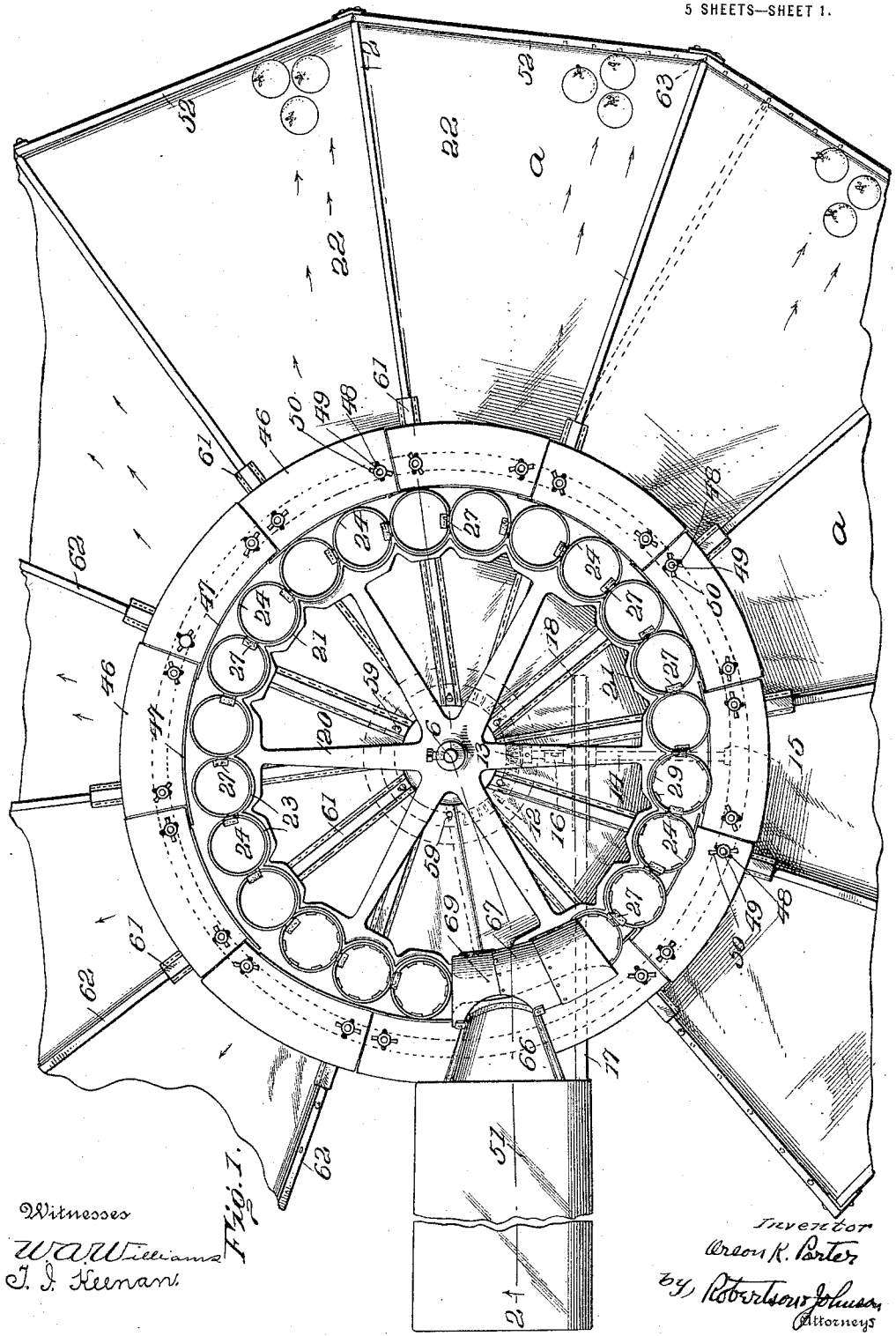

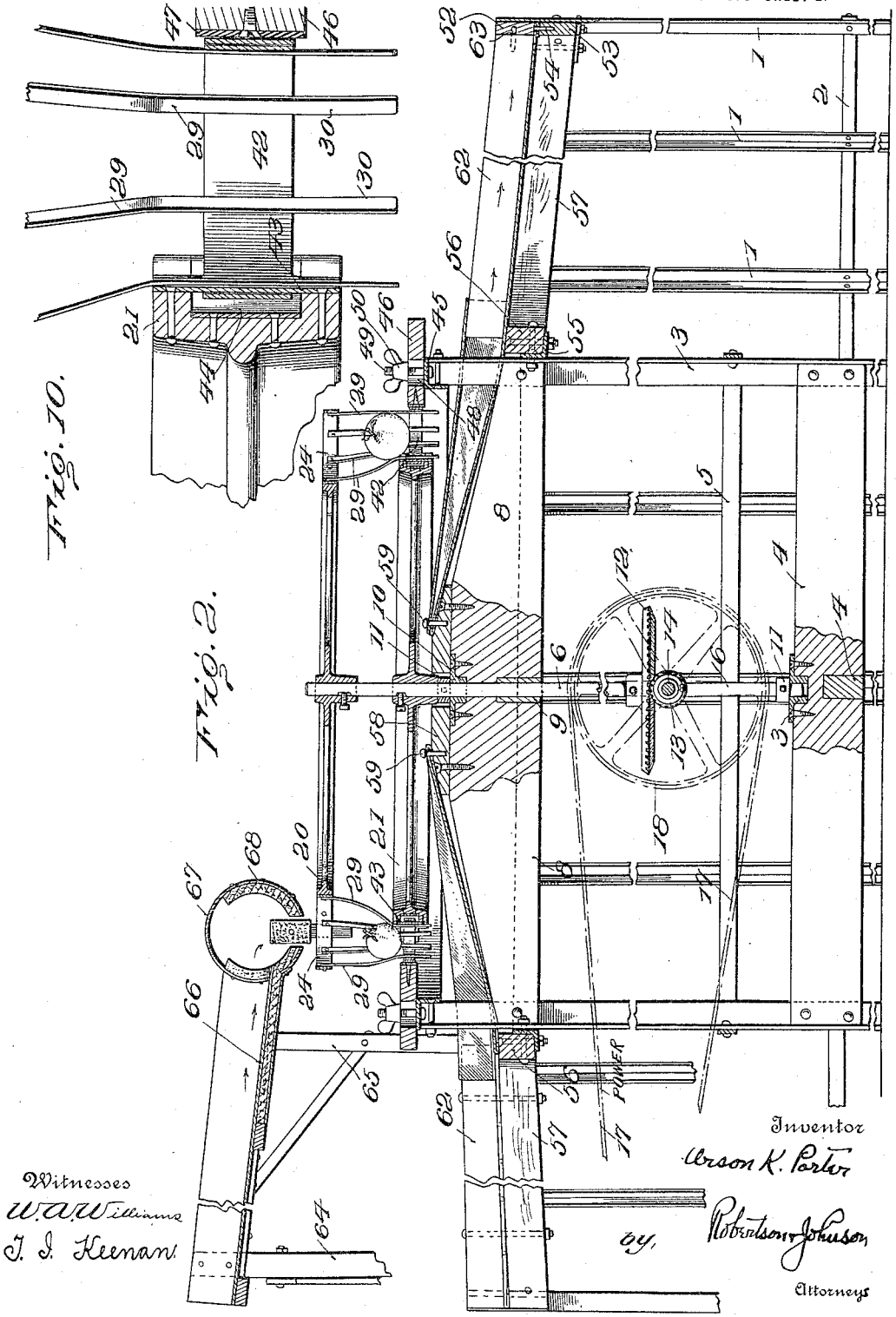

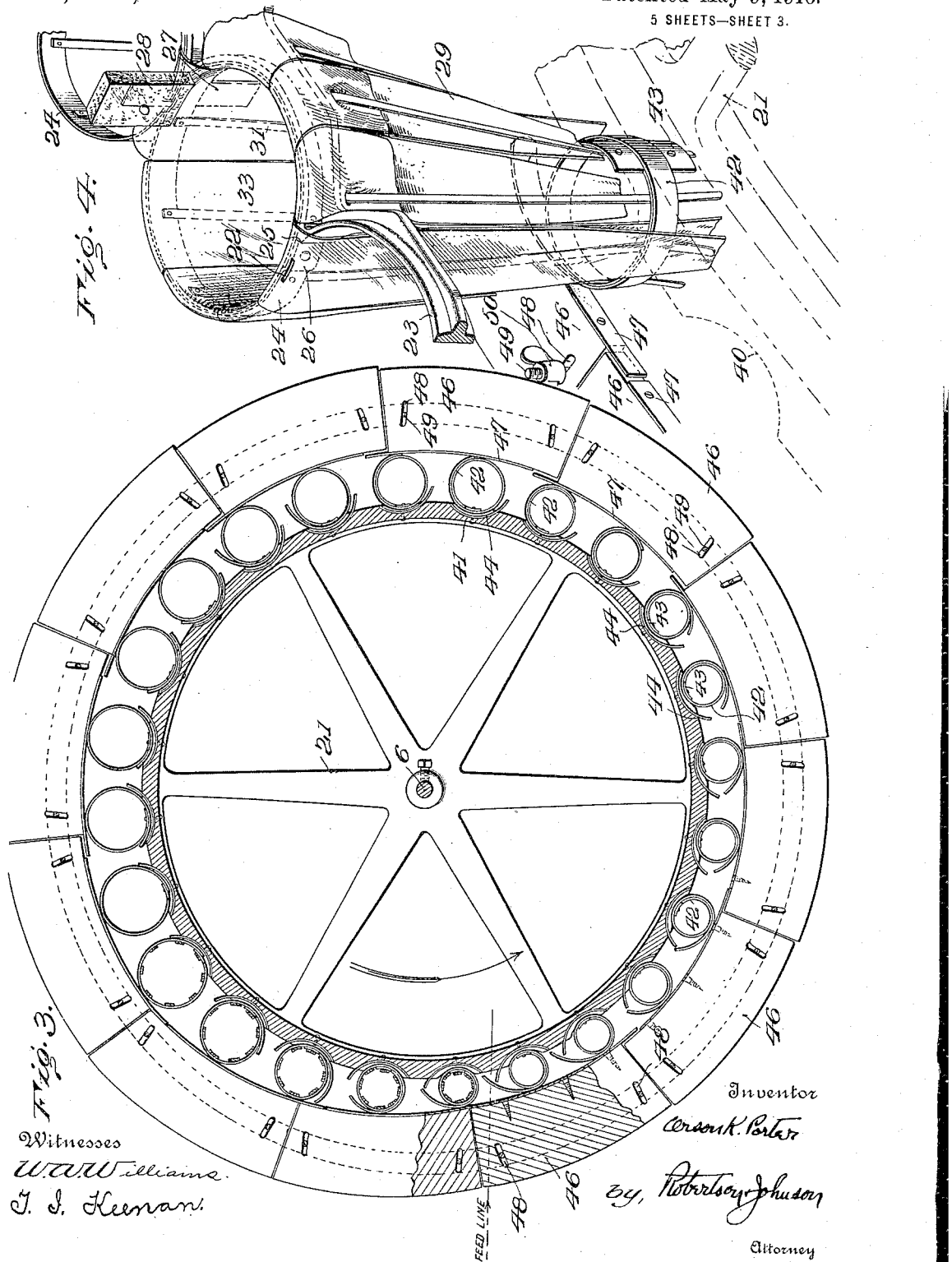

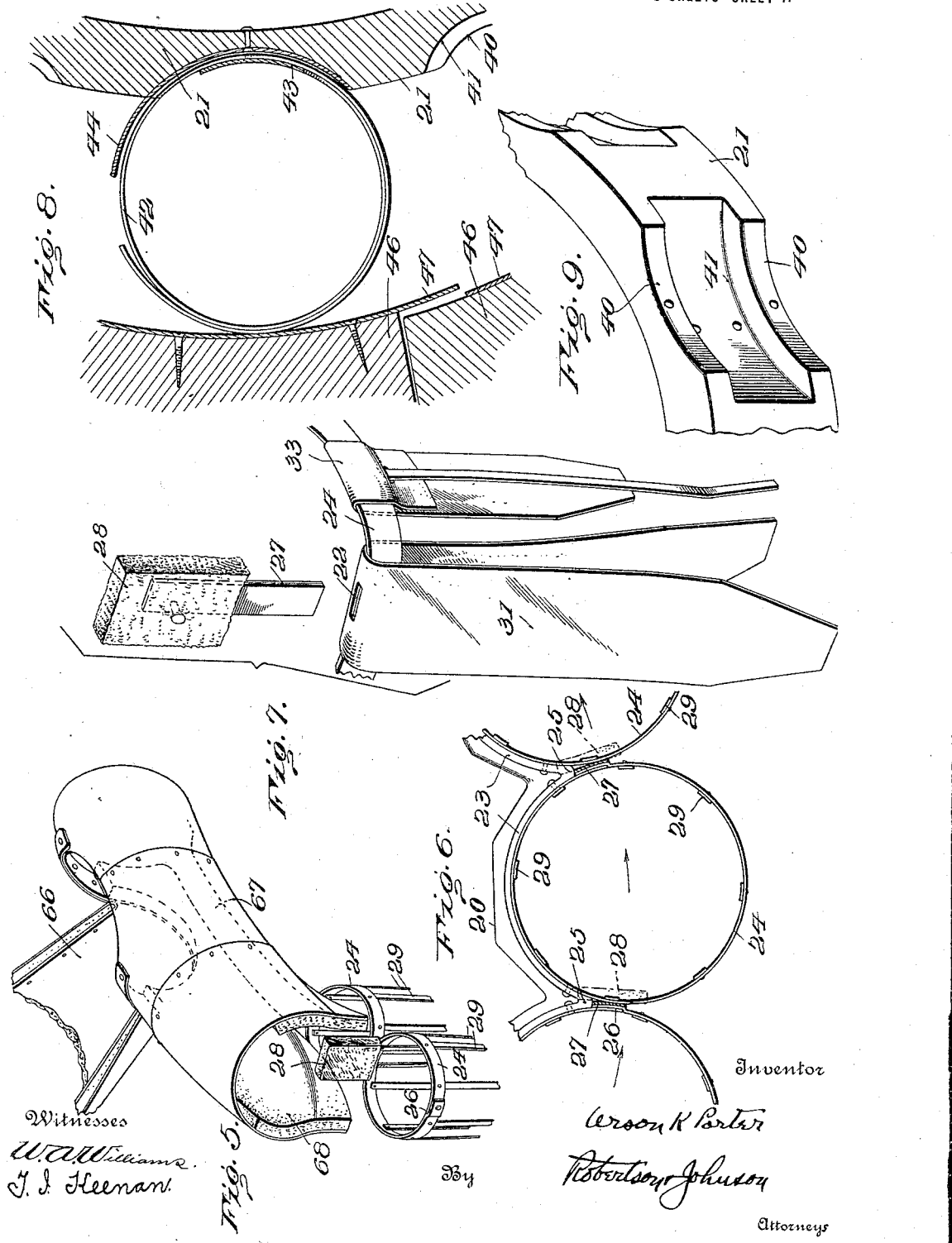

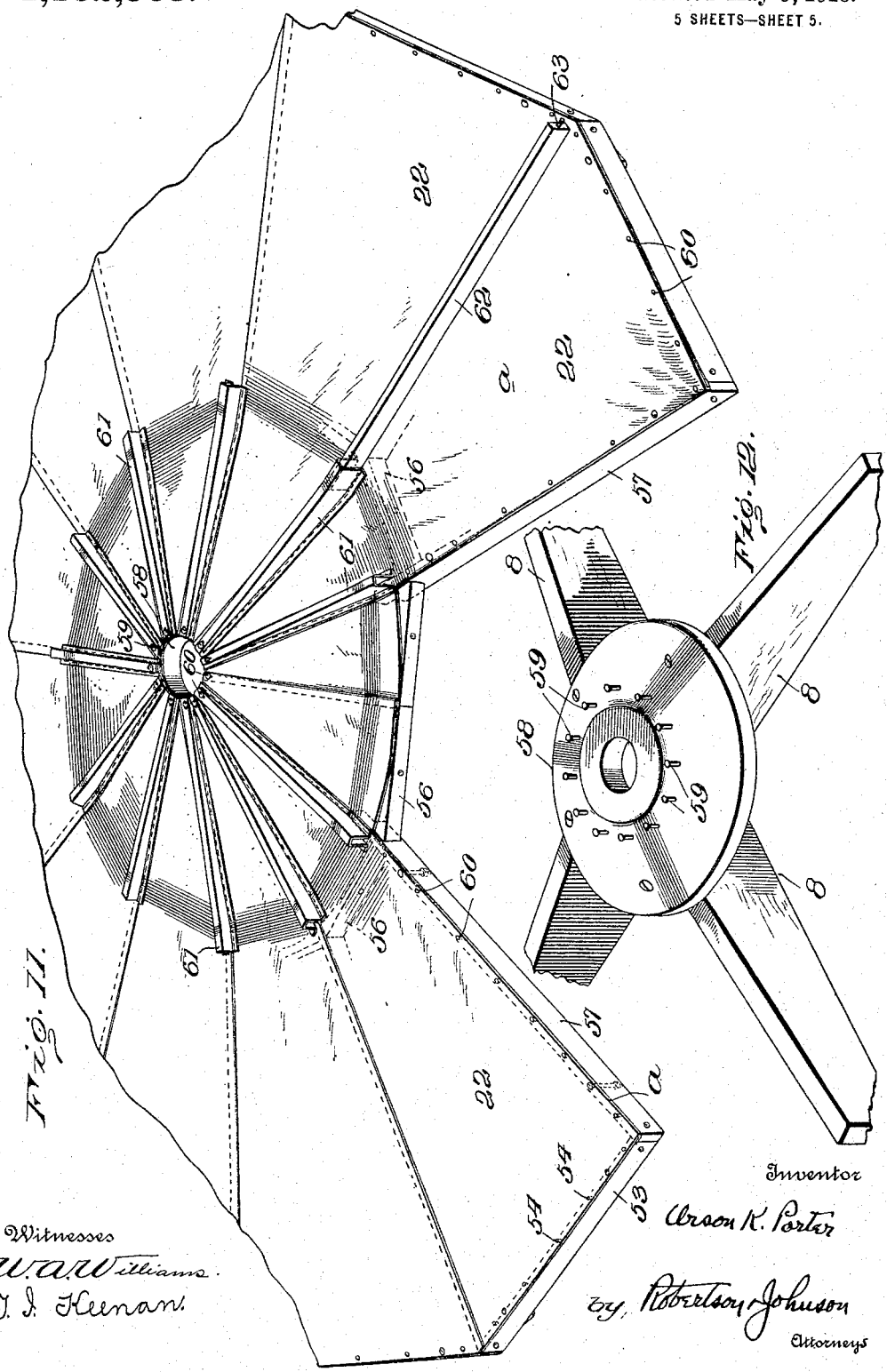

UNITED STATES PATENT OFFICE.

ORSON K. PORTER, OF THE DALLES, OREGON, ASSIGNOR TO OREGON FRUIT CLEANER COMPANY, OF THE DALLES, OREGON, A CORPORATION OF OREGON.

FRUIT-GRADER.

1,182,505.   Specification of Letters Patent.   Patented May 9, 1916.

Application filed March 20, 1913. Serial No. 755,610.

*To all whom it may concern:*

Be it known that I, ORSON K. PORTER, a citizen of the United States, and a resident of The Dalles, in the county of Wasco and State of Oregon, have invented certain new and useful Improvements in Fruit-Graders, of which the following is a specification.

My invention relates to fruit graders and is an improvement on the grader of Patent No. 1,043,249, granted November 5, 1912.

The object of my invention is to increase the capacity of the machine, make it more compact and stronger and to improve materially the construction of the various parts, more particularly the individual fruit holding bags or pockets, the arrangement and operation of their outlets, the construction of the bins, the framing of the machine, the feeding devices, etc.

To this end, my invention consists in the matters hereinafter described and more particularly set forth in the appended claims.

Referring to the drawings: Figure 1 is a plan view of the grader, certain parts being broken away. Fig. 2 is a vertical section on the line 2—2, Fig. 1, looking in the direction of the arrows, the clothing with which the fruit holders are provided being omitted for clearness, and a feed spout being shown instead of the cleaner. Fig. 3 is a plan view looking down on the lower wheel, the band spring outlets supported thereby and the gage rail, other parts of the machine being omitted for clearness and parts at the left of the figure being shown in section. Fig. 4 is a perspective view of one of the individual fruit holding bags or pockets showing the means for supporting the same and certain other features of the machine. Fig. 5 is a perspective view of the elbow feed spout showing also adjacent fruit holders and the mode in which the fruit is fed out of the spout. Fig. 6 is a plan view looking down on the upper wheel and showing the manner in which the individual fruit holders are supported, the feeding stubs being shown in section. Fig. 7 is a perspective view of one of the feeding stubs detached and of a part of one of the holders showing its clothing. Fig. 8 is a horizontal section through the lower support, band spring outlet and cam rail. Fig. 9 is a detail perspective view showing one of the grooves in the periphery of the lower supporting wheel. Fig. 10 is a detail sectional view in a vertical plane through the band spring outlet, its support, one of the cam sections of the gage rail, etc. Fig. 11 is a perspective view illustrating the canvas flooring of the bins, the arrangement of the partitions and the framing of the bins proper, the upper part of said framing and most of the outer sections of the partitions being omitted. Fig. 12 is a perspective view of the support for the central part of the canvas flooring.

While various features of my invention are equally applicable to a grader in which the bins are arranged in a straight line instead of having their openings alined on a circle, I prefer the circular arrangement which is characteristic of the embodiment of my invention illustrated herein. This machine, like the grader of my patent, is provided with bins having openings increasing in width successively from the head to the foot of the grader and with individual fruit holding bags or pockets movable over the bins and having band spring outlets for co-action successively with cam sections of a gage rail each of which corresponds to one of the bins, the spring outlets being thus permitted to enlarge as they pass successive bins and the fruit being delivered to the first bin at which the spring outlet expands sufficiently to permit it to pass through. The differences in construction will appear in the following detailed description of the machine.

The frame is provided with outer legs 1 arranged at the outer corners of the bins and connected by horizontal braces 2 and with inner legs 3 connected by a pair of heavy braces 4 intersecting each other at right angles and with light braces 5. An upright shaft 6 is journaled at its lower end in a bearing 7 supported by one of the braces 4. Braces 8 corresponding to the braces 4 connect the inner legs 3 and 4 and are provided at 9 and 10 with bearings for the shaft 6, endwise movement of which is prevented by the collars 11. Fixed to this shaft is a miter gear 12 with which meshes a small gear 13 fast on the shaft 14, which has its outer ends supported in suitable bearings 15—16 on the framing and is driven by the belt 17 running over the pulley 18. The shaft 6 carries the upper support 20 and the lower support 21, these supports being shown as wheels fast to the shaft and in the peripheries of which the individual fruit holding bags or pockets are mounted. On reference to Figs. 1 and 2 it will be apparent that as the shaft rotates the lower ends of the individual fruit holders are carried in a circle successively over the bins 22 from the head to the foot of the grader.

Referring particularly to Figs. 1, 2, 4 and 6, it will be seen that the periphery of the upper wheel 20 is composed of a series of scallops 23, in each of which fits the top metal ring 24 of one of the fruit holders. The space between the scallops is plane as indicated at 25 and it has been found convenient to locate the rings by placing the end of the overlap 26 against the plane face 25. The rings are secured by riveting or other suitable means. The rings 24 of adjacent holders are almost in contact, each one touching a feeding stub 27 firmly held between them and the purpose of which will be hereinafter described. This stub has felt or other soft clothing 28 secured to it. It is obvious that these rings could be cast as part of the support or wheel but the construction just described is cheaper and more satisfactory.

The fruit holders of my aforesaid patent were provided with top metal rings secured to a support and had bodies of canvas, their lower ends being formed by band spring outlets. The holders of my new grader are provided with a series of longitudinal spring strips 29 secured to the rings 24 and extending down through the spring outlets hereinafter to be described. The lower ends of these strips are bent so that while the part above them is curved they are substantially vertical, the purpose being to prevent the ends 30 from projecting inward to obstruct the passage and, on the contrary, to insure a substantially cylindrical passage for the fruit. As indicated in Fig. 2, the inner strips, that is those nearest the center of the wheel are bent considerably more than the rest. These strips make substantially the whole of the bags or pockets expansible and avoid the necessity for having a complete body of canvas, it being necessary only to clothe said strips and the inside of the holder sufficiently to prevent injury of the fruit. The manner in which I prefer to do this is best shown in Figs. 4 and 7 in which 31 is a long double strip of canvas having a slot 32 receiving the stub 27 and falling down inside of each of the two adjacent holders. 33 is one of the shorter strips which is mounted by passing it over the end of a spring strip 29 and letting the other end fall down inside the holder. It will be evident that these pieces of canvas need not have their edges in contact and it is also true that they need not extend to the ends of the strips 29, or indeed to the band spring which forms a variable outlet at the bottom of the fruit holding bag or pocket. It is necessary, however, that the metal parts should be sufficiently covered to protect the fruit and the cross piece 43 in particular should be covered. I prefer to use spring strips secured to the metal rings 24 as described but unresilient sections of much greater width might be employed and the sections, whether flexible or resilient, might be hinged or hung on the rings 24, as in my application for fruit grader Ser. No. 755,611, filed of even date herewith.

The automatically expansible outlets of the fruit holding bags or pockets are best illustrated in Figs. 2, 3, 4, 8, 9 and 10. The periphery of the lower wheel 21 is provided at its top and bottom with concavities 40 between which is a curved slot 41 corresponding thereto but of greater depth. As shown in Fig. 10, the band spring outlet 42 terminates at one end in a metal cross piece 43 which is riveted to the periphery of the lower wheel 21 in the concavities 40. As best shown in Figs. 3 and 8 a metal guide 44 is riveted in the slot 41, its forward end being flush with the periphery of the lower wheel 21 and its rear end extending some distance out beyond the same. The band spring 42 passes around outside the spring strips 29 and coiling on itself passes through the slot 41 behind the cross piece 43, its movement being directed by the metal guide 44 which insures a circular form for the opening. The band spring 42, the concavities 40, the slot 41 and the metal guide 44 are all concentric but their center is not always in the same vertical line as the center of the metal rings 24 since while the latter is always the same distance from the axis of the shaft the former moves in and out. It is in order to equalize the operation of the spring strips so far as possible and to make the inlets and outlets of the holders as nearly coaxial as may be during the major part of the grading that I curve the inner strips 29 more than the others. The guides 44 (see Fig. 3) extend outward from the support and backward, i. e. in reverse direction to that in which the fruit holders travel. It will of course be understood that the details of construction above described are not invariable.

Some of the inner legs 3 are provided with extensions on the top of which is mounted an angle ring 45 on which is secured the circular gage rail which is adjustable, being made up of individually adjustable cam sections 46 which, beginning at the head of the grader, are spaced successively greater distances from that point to the foot of the grader, as will appear from an examination of Fig. 3. It is apparent, however, that there need not be an abrupt change from one section to the next but that the faces of the sections may lie in a continuous curve which gradually increases its distance from the support 21 of the spring outlets. As shown in Fig. 2, each of these sections lies in the path of the band spring outlets so that they thus control the extent to which said outlets may open, the opening increasing as the holders pass over each succeeding bin. The inner edge of each of these cam sections is provided with a friction covering 47, preferably of leather, which in each instance extends forward a short distance beyond the end of its section. The frictional action controls the band spring more effectively. Each cam section 46 is provided with parallel slots 48 through which pass bolts 49 secured in the angle ring 45 and permitting adjustment which is fixed by the wing nut 50. While any given section may be moved inward along a line parallel with the slots, sufficient play is provided so that one end of the section may be adjusted with respect to the other, thus making it possible to secure for the gage rail a continuous face as above described, should this be desired.

In the embodiment of the grader herein illustrated, I have shown ten bins for each of which there is a corresponding cam section 46. There are also two other cam sections between the foot and the head of the grader which are on a sharper curve from that of the other cam sections 46, the faces of which in the particular embodiment illustrated are on concentric arcs of different radii. This closes the band spring outlets from their extreme open position to the position in which they are ready for the first bin. The relation between the metal guides 44 and the free ends of the band springs is such that after the band spring has passed through the slot 41, its free end can clear the outer end of the guide as shown in Fig. 3. The arrangement is also such that there can never be any interference between the free ends of adjacent band springs. An examination of Fig. 3 will show that the only time at which the free ends of adjacent band springs are on the same side is while the outlet is being closed and even in this case, it will be noted from an examination of Fig. 3 that there can be no interference.

Referring now to Figs. 1, 2, 11 and 12, I will describe the general arrangement of the machine, the construction of the bins, the upper framing and the feeding devices. While I have not originated the circular type of grader, I have adapted and utilized this type to produce a very compact machine in which, within the outlines of the grader, I am enabled to include a cleaner and feeder. The bins are radial, extending a considerable distance out from the center and are arranged in a series starting at the head of the machine just in advance of the feeding devices and continuing around to a point adjacent the foot of the grader the space between the first and last bin being occupied by the cleaner 51. The saving in space will be obvious and as I have so arranged the gage rail that the part of it which returns the band spring outlets from open to closed position lies at a point opposite the space in which the cleaner is located, I have not in any way detracted from the capacity of the grader as such.

The framing for the bins is divided into upper and lower sections 52 and 53 respectively, the lower section being secured to the outer legs 1 and the upper section being removably mounted on the lower section, one or the other of these parts being provided with pins 54. An angle ring 55 is secured to the inner legs 3 and serves as a support for a series of blocks 56 which rest on the flange and whose backs conform to the curvature of the ring. These blocks act as braces between adjacent radial bars 57 which are on the line between adjacent bins. On the upper braces 8 is mounted a central disk 58 as shown in Fig. 12, the disk carrying pins 59 over which fit eyelets 60 at the edge of the canvas flooring a. This flooring is made up of a single piece having eyelets 60 along its outer edges as well as around the edge of the hole at its center. These eyelets fit over other pins 59 in the lower section of the framing 53 and in the bars 57 of the first and last bins. The canvas flooring is provided with canvas partitions 61 which are in the nature of pockets which may be stuffed with any suitable material and which increase in height as they get farther away from the center. They terminate at a point adjacent the angle ring 55 or, to put it differently, at the end of the raised central portion of the flooring. It is through these canvas partitions that the extended inner legs 3 which support the angle ring 55 pass. Into the open ends of these canvas partitions are inserted the ends of wooden partitions 62 which are located over the bars 57. The first and last of these partitions or walls 62 cover the eyelets and pins which hold the canvas flooring in proper position and the parts making up the upper section 52 of the bin framing cover up the rest of the pins and eyelets around the outside of the bins, a ready means for connecting and disconnecting the canvas flooring being thus provided with which the fruit cannot possibly come into contact and which avoids the necessity for tacking the canvas and pulling out the tacks whenever the machine is to be moved. The wooden partitions 62 may be provided with pins 63 fitting in one of a plurality of holes in the adjacent parts 52 it being thus possible to shove back one of these partitions to free its outer end and then place the same in a different hole to increase one of the bins at the expense of the adjacent bin where one grade is running heavier than the next. It will be obvious that the nature of the canvas partition permits this movement of the wooden partition. The fact that all the upper framing and partitions except the two outer walls 62 are removable without unscrewing a bolt makes it easy to dismantle a grader when it is desired to move it. The canvas flooring may also be released from the outer pins and thrown over the center of the machine. The outer legs and braces may readily be removed and their arrangement is such that they will fold into a compact bundle.

In Fig. 1 I have shown a cleaner B provided with one of the feeding devices and in Fig. 5 I have shown feeding devices alone. In either case suitable supports such as 64, 65 would be provided. Where only the feeding spout is used the supports 65 might be secured to the framing of the grader. In either case, I employ an elbow feed spout 66—67 both parts of which are protected by clothing 68. The part 67 of the feed spout is in the nature of a tube lying in the arc of a circle of which the axis of the machine is the center and provided at its bottom with a slot 69. The bottom of the member 67 is in an approximately horizontal plane but toward the outlet end it gradually curves into a substantially vertical plane so as to permit the fruit to pass freely into the fruit holder. The other end of the slot has its corners eased off somewhat to avoid the possibility of the stubs 27 catching on them.

The operation of the machine may briefly be stated as follows: Fruit is fed by the stubs 27 out of the elbow members 67 of the elbow feed spout into the individual fruit holding bags or pockets which are carried in a circular path by the rotating wheels 20—21 successively over the bins from the head to the foot of the grader, the band spring outlets 42 being moved past successive sections 46 of the gage rail, the extent to which the band spring outlets are able to open being thus controlled, the free ends of said springs passing through the slots 41 behind the metal cross pieces 43 and being constrained to move in the proper path by the metal guides 44. As the holders make their circuit they deposit the fruit in the first bin at which the outlet opening is sufficiently large to permit the fruit to pass the holder thereafter continuing and its outlet enlarging and being finally closed up again just before the head of the grader is reached for the next cycle of operations.

What I claim as my invention is:

1. In a fruit grader, a support, individual fruit holders carried thereby, and band spring outlets for said holders having one end secured to the support and having the other end free, said support having curved slots back of the points at which the several band spring outlets are secured through which the free ends of said springs may pass.

2. A fruit grader comprising in combination, a series of bins, a support, individual fruit holders carried thereby, means for moving said support with said holders over said bins from the head to the foot of the grader, band spring outlets for said fruit holders having one end secured to the support and having the other end free, said support having curved slots lying in the plane of said band spring outlets back of the secured ends thereof, and through which their free ends may pass, and a gage rail extending from the head to the foot of the grader adjacent the path of said band spring outlets and coöperating with said band spring outlets to effect the successive enlargement of the same during their movement over the bins.

3. A fruit grader comprising in combination, a series of bins, a support, individual fruit holding bags or pockets carried thereby, means for moving said support with said fruit holding bags or pockets over said bins from the head to the foot of the grader, band spring outlets for said fruit holding bags or pockets having one end secured to the support and having the other end free, said support having like concavities arranged in pairs and in which the band spring outlets are secured with curved slots lying in the plane of said band spring outlets between the members of each pair of concavities but deeper than said concavities and through which the free ends of said band spring outlets may pass, and means coöperating with said outlets for enlarging and for diminishing them.

4. A fruit grader comprising in combination, a series of bins, a support, individual fruit holders carried thereby, means for moving said support with said holders over said bins from the head to the foot of the grader, band spring outlets for said fruit holders having one end secured to the support and having the other end free, said support having curved slots lying in the plane of said band spring outlets back of the secured ends thereof and through which their free ends may pass, a curved guide for the free end of each band spring outlet secured in the curved slot corresponding in curvature therewith and extending outward beyond the surface of the support at the rear side of said curved slot, and a gage rail extending from the head to the foot of the grader adjacent the path of said band spring outlets and coöperating with said band spring outlets to effect the successive enlargement of the same during their movement over the bins.

5. A fruit grader comprising in combination, a series of bins, a support, upright fruit holding bags or pockets having variable outlets and carried by said support, means for moving said support with said upright fruit holding bags or pockets over said bins from the head to the foot of the grader, and a stationary gage rail having individually adjustable cam sections corresponding to individual bins and located adjacent the path of said variable outlets.

6. A fruit grader comprising in combination, a series of bins, a support, fruit holders having variable outlets and carried by said support, means for moving said support with said fruit holders over said bins from the head to the foot of the grader, and a stationary gage rail located adjacent the path of said variable outlets and having its active face covered with friction material.

7. A fruit grader comprising in combination, a series of bins, a support, fruit holders having variable outlets and carried by said support, means for moving said support with said fruit holders over said bins from the head to the foot of the grader, and a stationary gage rail having individually adjustable cam sections corresponding to individual bins and located adjacent the path of said variable outlets, each cam section having a friction covering overlapping the next toward the foot of the grader.

8. A fruit grader comprising in combination, a series of bins, a support, fruit holders having variable outlets and carried by said support, means for moving said support with said fruit holders over said bins from the head to the foot of the grader, and a stationary gage rail having individually adjustable cam sections corresponding to individual bins and located adjacent the path of said variable outlets, each section having one end adjustable with respect to the other.

9. A fruit grader comprising in combination, a support, fruit holding bags or pockets carried by said support, means for giving travel to said support with said fruit holding bags or pockets, band spring outlets for said fruit holding bags or pockets carried by said support, guides located on said support adjacent the band spring outlets and curved in circular arcs for maintaining the band springs in circular form and means for altering the size of the outlets.

10. A fruit grader comprising in combination, a support, individual fruit holders having downwardly extending inwardly and outwardly movable sections secured to the upper part of the support and having band spring outlets secured to the lower part of the support, said sections extending down within and preferably through said band spring outlets, means for giving travel to said support with said holders, and a gage rail coöperating with said outlets for altering their size as the support and holders travel.

11. A fruit grader comprising in combination, a support, individual fruit holding bags or pockets having downwardly extending spring strips secured to the upper part of the support, means for giving travel to said support with said bags or pockets, band spring outlets secured to the lower part of the support, and inclosing said spring strips, and cams for altering the size of said outlets.

12. A fruit grader comprising in combination, a series of bins, a support, individual fruit holders carried by said support and provided with flexible strips depending from the upper part of the support, band springs inclosing said strips at the bottom, means for moving said support and holders over successive bins, cams adjacent the path of said band springs and coacting therewith to determine the extent to which said band springs may open, and guides for maintaining the band springs in circular form.

13. A fruit grader comprising in combination, a support having its edges scalloped and provided with plane faces between said scallops, individual fruit holding bags having top rings provided with an overlap, the face of which is located in contact with one of the plane faces above referred to.

14. In a fruit grader, a support having spaced concavities and a correspondingly curved slot between said concavities but deeper than the same, and a band spring outlet having a cross piece secured in said concavities, the free end of said band spring passing through said slot behind said cross piece.

15. In a fruit grader, a support having spaced concavities and a correspondingly curved slot between said concavities but deeper than the same, a band spring outlet having a cross piece secured in said concavities, the free end of said band spring passing through said slot behind said cross piece, and a curved guide for the free end of the band spring.

16. A machine of the character described comprising in combination, fruit grading apparatus arranged in a circle, a series of bins under said apparatus arranged side by side around its axis and extending well out beyond said apparatus, there being a space between the last bin and the first bin, and a fruit cleaner and feeder located in said space and in communication with said fruit grading apparatus.

17. A machine of the character described comprising in combination, a fruit grader having a series of radial bins, a rotatable support over said bins, individual fruit holders carried by said support and having variable outlets, a cam rail adjacent the path of said outlets, means for rotating said support with said fruit holders, said cam rail coacting with said outlets to secure their successive enlargement as the holders pass over successive bins, and having between the first and the last bins cam portions for closing the outlets to initial position, a space being left between the last and first bins outside the cam rail, and cleaning and feeding devices located in said space for cooperating with said grader.

18. A fruit grader comprising in combination, rotary grading apparatus having individual fruit holders and a clothed feeding stub back of each holder, a feed spout having a longitudinal member and an open ended arc shaped tubular member with which said longitudinal member communicates located above the path of said feed stubs and having a slot lying in the arc of the circle in which said feed stubs move for receiving the same, and means for rotating the rotary grading apparatus.

19. A fruit grader comprising in combination, a support, individual fruit holders arranged thereon in a circle, feed stubs arranged in a circle adjacent said holders, means for rotating said support, and a feed spout having an arc shaped transverse member and having in its bottom a slot lying in the circle in which said feed stubs move for receiving the same, said slot widening at its delivery end to substantially the width of the inlets of the fruit holders.

20. In a fruit grader, a support, individual fruit holding bags or pockets having top rings secured thereto, feed stubs secured between adjacent holders, and a strip of cloth through a slot in which each stub passes and which falls down inside each of said adjacent holders.

21. In a fruit grader, a support having its edges scalloped, individual fruit holding bags or pockets having top rings secured in said scallops, feeding stubs secured between adjacent holders, and a strip of cloth through a slot in which each stub passes, and which falls down inside each of said adjacent holders.

22. A fruit holding bag or pocket having a top frame provided with depending movable sections secured to said frame, and cloth strips having a hole receiving one of said sections passing around the upper edge of the frame of the holder and falling down inside the holder.

23. A fruit holding bag or pocket having a top frame provided with spring strips secured to said frame and depending therefrom, the lower ends of said strips being bent to provide an unobstructed outlet for said bags or pockets.

24. A fruit grader comprising in combination, a series of bins, a support, individual fruit holders carried thereby and having flexible metal frames provided with variable outlets, means for moving said support and holders over said bins, and means for controlling said outlets.

25. A fruit grader comprising in combination, a series of bins radially arranged around a center, a support rotatable around the same center, individual fruit holding bags arranged in a series on said support and having variable outlets, and a cam rail disposed around said center in the path of said outlets to determine the size thereof.

26. A fruit grader comprising in combination, a series of bins arranged in a circle, a support rotatable around the center of said circle, individual fruit holders carried by said support and having flexible metal frames, band springs inclosing said flexible frames and secured to said support, means for rotating said support to carry said holders over said bins from the head to the foot of the grader, and a cam rail located adjacent the path of said band springs for coaction therewith to determine the size of the outlets of the fruit holders.

27. A fruit grader comprising in combination, a series of bins arranged in a circle, a rotatable support above said bins having its outer part scalloped, individual fruit holders having at their tops metal rings secured in said scallops, band springs secured to the lower part of the support, and a cam rail located around the axis of rotation of the support and in the path of said band springs for contact therewith to determine the size of the outlets of the fruit holders.

28. A fruit grader comprising in combination, a support, fruit holders thereon having variable outlets, means for causing said support with said fruit holders to travel, and a stationary gage rail having individually adjustable cam sections located adjacent the path of said variable outlets, each cam section having a covering overlapping the section next beyond it in the direction of travel of said support.

29. A fruit grader comprising in combination, a support, individual fruit holders carried thereby, means for causing said support with said holders to travel, band spring outlets for said fruit holders having one end secured to the support and having the other end free, said support having curved slots lying in the plane of said band spring outlets back of the secured ends thereof and through which their free ends may pass, a curved guide for the free end of each band spring outlet secured in the curved slot and extending outward beyond the surface of the support at the rear side of said slot, and cams adjacent the path of said band spring outlets and coöperating therewith to effect the successive enlargement thereof during their travel with said support.

30. A fruit grader comprising in combination, a support, fruit holders thereon, means for causing said support with said fruit holders to travel, band spring outlets for said fruit holders carried by said support, curved guides located on said support adjacent the band spring outlets for coaction therewith, and means for altering the size of the outlets.

31. A fruit grader comprising in combination a support, fruit holders thereon, means for causing said support with said fruit holders to travel, band spring outlets for said fruit holders, curve guides on said support extending outward beyond the surface of the support and backward for coaction with said band springs, and cam means adjacent the path of said band spring outlets to effect their successive enlargement as the support and fruit holders travel.

32. In a fruit grader, a support, individual fruit holders carried thereby, and expansible and contractible band spring outlets for said holders having one end secured to the support, and having the other end free, said support being provided with a curved guide for the band spring, part of said band spring lying between the secured part of the spring and the curved guide, and means for progressively altering the size of said outlets.

33. In a fruit grader, a support, and a fruit holder carried by said support and having a flexible outlet member having one end fixed to said support but spaced therefrom and the other end free to pass between the fixed end and the support.

34. A fruit grader comprising in combination, a support, fruit holders thereon having frames composed of depending sections of flexible material, means for causing said support with said fruit holders to travel, and cam means for varying the said frames to alter the size of the outlets of the fruit holders.

35. A fruit grader comprising in combination, a support, individual fruit holders thereon having depending sections of flexible material, flexible outlet members inclosing said sections, means for causing said support and holders to travel, and means for controlling said outlet members.

36. A fruit grader comprising in combination, a support, fruit holders thereon having flexible bands located each in a horizontal plane and constituting circular outlets for said fruit holders, and means for varying the size of said outlets while maintaining their circular form.

In testimony whereof I affix my signature in presence of two witnesses.

ORSON K. PORTER.

Witnesses:
JOHN L. FLETCHER,
T. J. KEENAN.

Copies of this patent may be obtained for five cents each, by addressing the "Commissioner of Patents, Washington, D. C."